United States Patent [19]

Pepin

[11] Patent Number: 5,363,271
[45] Date of Patent: Nov. 8, 1994

[54] THERMAL SHOCK CRACKING RESISTANT MULTILAYER CERAMIC CAPACITOR TERMINATION COMPOSITIONS

[75] Inventor: John G. Pepin, Newark, Del.

[73] Assignee: E. I. Du Pont de Nemours and Company, Wilmington, Del.

[21] Appl. No.: 950,220

[22] Filed: Sep. 24, 1992

[51] Int. Cl.$^5$ .............................. H01G 4/20
[52] U.S. Cl. .................... 361/320; 361/305; 361/321.3; 252/514
[58] Field of Search ............ 361/305, 309, 320, 321.2, 361/321.3; 252/512, 514, 518

[56] References Cited

U.S. PATENT DOCUMENTS

| | | | |
|---|---|---|---|
| 3,944,696 | 3/1976 | Larry | 252/514 |
| 4,187,201 | 2/1980 | Hilson et al. | 252/512 |
| 4,255,291 | 3/1981 | Needes et al. | 252/512 |
| 4,567,151 | 1/1986 | Taylor | 501/15 |
| 4,803,591 | 2/1989 | Miyashita et al. | 361/321.2 |
| 4,865,772 | 9/1989 | Suehiro et al. | 252/512 |
| 5,089,172 | 2/1992 | Allison et al. | 252/512 |
| 5,174,925 | 12/1992 | Fujii et al. | 252/514 |

FOREIGN PATENT DOCUMENTS

| | | | |
|---|---|---|---|
| 0165642 | 6/1985 | European Pat. Off. | |
| 4149865 | 11/1979 | Japan | 361/305 |
| 58-011565 | 1/1983 | Japan | |

OTHER PUBLICATIONS

B. Bhooloka Rao et al., Effect of alkali and alkaline earth oxides on crystallization of Li2O-Al2O3-SiO2 glasses, Bull. Mat. Sci., vol. 12, No. 2, Jul. 1989 pp. 137–141.

1987 Proceeding 37th Electronic Components Conference, May 11, 1987, Boston, Mass., C. F. Smith, Jr., End Termination Compositions For Multilayer Chip Capacitors, pp. 157–170.

*Primary Examiner*—Bruce A. Reynolds
*Assistant Examiner*—Gregory L. Mills

[57] ABSTRACT

A thick film conductor composition suitable for use in forming terminations for titanate-based MLCs comprising finely divided particles of:

(a) electrically conductive precious metal and (b) metal oxide-based glass having a Dilatometer softening point of 400–700 C. comprising at least one glass modifier having an ionic field strength higher than the ionic field strength of the titanate cation, both (a) and (b) being dispersed in an organic medium.

6 Claims, No Drawings

THERMAL SHOCK CRACKING RESISTANT MULTILAYER CERAMIC CAPACITOR TERMINATION COMPOSITIONS

FIELD OF INVENTION

The invention is directed to thick film conductor compositions which are especially suitable for use in forming terminations for titanate-based multilayer ceramic capacitors.

BACKGROUND OF THE INVENTION

Multilayer ceramic capacitors consist of a plurality of interleaved and staggered layers of an electrically conductive film of metal (termed "electrode"), formed by the deposition (usually by screen printing or variations thereof) of a thick film paste and electrically insulating layers of a ceramic oxide (termed "dielectric"), formed by laying a cast dielectric tape or by casting a dielectric slurry over the dried electrode. The component is then fired to sinter both the dielectric and electrode into a monolithic and mechanically strong part with desired electrical properties. MLC capacitors are well known in the art. U.S. Pat. No. 2,389,420, for example, describes the structure, manufacture and properties of monolithic multilayer ceramic capacitors (MLCs).

In order for the capacitor to be joined to other electrical components and circuitry, an electrical connection to the electrodes must be made. This is done by way of what is called the "termination". Terminations are usually formed by applying a thick film paste to the end of the capacitor where the electrodes are exposed, usually by a dipping process or variations thereof, and firing to remove the organic components of the termination paste and to sinter the metal phase of the termination. MLC termination inks are usually dispersions of precious metals in an organic vehicle, with the metals ranging from 1:1 ratios of Pd and Ag, to pure Ag. Ternary terminations comprising Pt/Pd/Ag are also used, as are compositions containing non-precious metals and other combinations of precious metals. The termination also contains finely divided glass particles (termed "frits") which act to promote adhesion of the termination to the dielectric body. Dispersions of crystalline oxides can also be used. Firing of the termination is done to sinter the precious metal powder into a highly conductive solid form and to flow the glass frit to promote adhesion of the termination to the MLC dielectric body. Typical metal concentrations in termination inks range from 60 to 80 weight percent, with the frit comprising 12 to 0% and the organic vehicle comprising the remainder.

Three main kinds of MLC terminations exist. The so called "lead attach" terminations are used for MLCs where wire leads are attached to the termination using soldering and the capacitor is then encapsulated. Lead attach terminations contain mainly silver as the metal phase, with added frits to promote adhesion of the termination to the dielectric body. The so called "hybrid terminations" are usually Pd/Ag in composition, with the Pd:Ag ratio ranging from 1:1 to 1:4. These terminations are typically used to attach MLCs to hybrid circuits. The third type of termination, the so called "plateable base" terminations, typically contain only Ag as the metal phase, and are electrochemically plated with a predominantly Ni layer after termination firing. The Ni layer is present to control leaching of the termination metal phase during soldering to prevent solder de-wetting and soldering failure, especially when aggressive soldering processes are used.

Soldering of the termination to outside components and circuitry is done a number of ways. In the past, connection was typically done through wire leads attached to the termination and "lead attach" termination compositions were used extensively. The MLC body and part of the leads were encapsulated in a material which protected the part from the environment and helped adhere the leads to the MLC body. Recently, a new means of joining MLC parts to other circuitry termed "surface mounting" has been developed. Using this technique, unencapsulated MLC chips are directly soldered onto printed circuit boards using either reflow or wave soldering techniques. In the reflow technique, an amount of a solder paste is applied to the MLC termination and the printed circuit board. Then the solder is melted by infrared heating, boiling vapor condensation, or laser heating. The other principal technique of soldering is wave soldering. In this method, the MLC is glued to the printed circuit board usually using a heat curable epoxy composition then the printed circuit board is passed through an agitated bath of molten solder at a specified rate.

Wave soldering is the most aggressive soldering technique used in surface mounting. During wave soldering the MLC part is subjected to a rapid increase in temperature due to immersion of the part in the solder wave. In addition, it is also subjected to a rapid cool after leaving the solder wave but the time rate of temperature change during the cooling phase is less than the heating phase. The rapid temperature changes of wave soldering are ameliorated somewhat by the use of pre-heaters which heat the printed circuit board and the components on the board before immersion in the solder wave. But even with preheating, the thermal shock experienced by the parts is severe. The use of wave soldering is particularly stressful to MLC parts due to the rapid and large increase in temperature the part experience.

The seventy of the wave soldering process with MLC parts with terminations plated with Ni is worse yet since solder seems to rapidly wet the Ni plating, causing more rapid heat transfer from the solder to the MLC, and a rapid temperature rise in the interior of the MLC part as the heat of the solder is conducted from the termination through the electrodes.

The combination of wave soldering and Ni-plated Ag-based terminations has given rise to a particularly insidious, widespread and well known problem in the MLC industry termed "thermal shock cracking". The rapid heat transfer from the solder bath to the MLC part during wave soldering of Ni-plated parts causes cracking of the dielectric body which is usually manifested as cracks on the surface of the MLC part which usually intersect the termination. These cracks can cause failure of the MLC parts soon after wave soldering or can cause failures during the service lifetimes of the parts.

This invention deals with a means of reducing or eliminating the incidence of thermal shock cracking of MLC parts through the composition of the termination ink.

SUMMARY OF THE INVENTION

Generally, this invention is directed to an MLC termination ink containing primarily silver dispersed in an organic vehicle with added glass frit. The frit is designed to interact with the dielectric oxide phases of the body of the MLC to form a new crystalline phase at the interface between the MLC body and the termination. The reaction layer, being a new crystalline phase with a different specific molar volume, imparts a net residual stress to the MLC part after the firing of the termination, assuming the interface between the reaction layer and dielectric body remains coherent. The residual stress counteracts stresses caused by wave soldering thereby decreasing the tendency of MLC parts to exhibit "thermal shock cracking".

In particular, the invention is directed to a thick film conductor composition suitable for use in forming terminations for titanate-based MLCs comprising by weight finely divided particles of:
(a) 90-99% electrically conductive precious metal and
(b) 10-1% metal oxide-based glass having a dilatometric softening point of 400-700 C. comprising 1-10% by weight, basis glass, of at least one glass modifier having an ionic field strength higher than the ionic field strength of the titanate cation which forms a titanate phase upon reaction with the titanate-based dielectric and the remainder of the glass modifiers have an ionic field strength similar to the titanate cation, both (a) and (b) being dispersed in an organic medium.

The term "titanate cation" refers herein to the cation which, combined with the titanate anion, forms a titanate phase. For example, Ba is the titanate cation in $BaTiO_3$.

DETAILED DESCRIPTION OF THE INVENTION

The invention is directed to multilayer ceramic capacitor (MLC) termination compositions which contain a new frit system which interacts with the MLC body dielectric oxides to produce phases which yield internal residual stresses in the finished part. The frits, primarily lead borosilicate in composition, contain additional ions with ionic field strengths which will react with the dielectric to produce new titanate phases with specific unit cell volumes different from the phases present in the MLC body. The residual stresses induced by this reaction lessen the stresses of wave soldering, reducing the incidence of thermal shock cracking in MLCs.

The principles of this invention pertain mainly to the crystal-chemical reactions between the termination frit and the dielectric comprising the body of the MLC. A concept of this invention is that by tailoring the composition of the frit in the MLC termination ink with ions of specific ionic field strengths, new phases will occur at the interfacial reaction zone between the termination and the dielectric. These new phases have specific volumes which are different from the oxide phases in the dielectric and this difference causes a net residual stress in the MLC part. This stress counteracts the stresses of wave soldering, thereby decreasing the number and frequency of MLC body cracks due to soldering.

The tendency of an ion present in a glass to react with the phases present in the MLC body can be qualitatively predicted based on the ionic field strengths of the ions involved. Ionic field strength is defined as the charge of an ion divided by the square of its ionic radius. It is essentially a measure of the strength of the electrostatic field created by the ion when the ion is considered as a point charge in space. For example, the common ionic state of potassium is +1 with an ionic radius of 1.33 A (A=angstrom), yielding an ionic field strength of $(+1/(1.33*1.33)=0.57$. Sodium, with an equal ionic charge yet smaller ionic radius of 0.97 A has a higher field strength of 1.06. In general, higher ionic charges and/or smaller ionic radius will contribute to higher ionic field strengths.

Most MLC dielectric bodies are based on phases of barium titanate or phases based on reaction products of mixtures of barium and neodymium titanates. The ionic field strength of $Ba^{2+}$, for example, (charge=2+; radius=1.34 A; field strength=1.11) is quite low relative to most other ions. This is due to its combination of large ionic radius and low ionic charge.

Since barium is such a low field strength ion, it can readily undergo reaction with other ions when a crystalline barium containing phase is reacted with a glass containing an ion or ions with higher field strengths. For example, when barium titanate ($BaTiO_3$) is reacted with a magnesium borosilicate glass at high temperature (approximately 800° C.), the magnesium is seen (by electron microprobe and x-ray powder diffraction techniques) to form magnesium titanate ($MgTiO_3$) and the barium previously present in the barium titanate is observed to diffuse into the glass. This reaction is predicted by the ionic field strength of $Ba^{2+}$ (1.11) versus the high field strength of $Mg^{2+}$ (4.59).

Note that in the above example, it was only the $Mg^{2+}$ which was observed to react with the barium titanate phase despite the presence of ions with much higher ionic field strengths: $Si^{4+}$ and $B^{3+}$ with ionic field strengths =22.68 and 56.71 respectively. These ions, however, are glass-formers in the borosilicate glass and are therefore effectively trapped within the glass structure and unavailable for reaction with the barium titanate phase. Only the glass modifiers such as the $Mg^{2+}$ can react. Likewise, the titanium present in the dielectric phase has a much higher field strength (=8.65) than the Ba, yet it does not react with the glass. This is because the $Ti^{4+}$ ion is not readily soluble in most acid glasses, and charge compensation due to the interdiffusion and phase formation is not possible.

This invention describes an MLC termination composition containing a dispersion of a silver powder plus a dispersed frit in which the composition of the glass frit is tailored so as to produce reaction product phases with the dielectric oxide phases contained in the MLC chip body.

There are a number of required or desired characteristics in the glass frit in the termination ink in order for the mechanism of this invention to operate:
1. The glass contained in the termination paste should be conventional in the sense that it is metal oxide-based and contains glass formers and network modifiers. This constraint is due to the standard practice of firing MLC terminations in air, rather than in reducing or neutral atmospheres. Glass formers such as silicon oxide and boron oxide are common, and other metal oxides are acceptable as glass modifiers. "Unconventional" glasses such as non-oxide based or those made by ultrafast quenching from the melt are not acceptable.
2. The glass should contain glass modifier ions which can be readily substituted by other ions. These ions can also be glass modifiers. Subject to the restrictions thus far, glasses in the lead borosilicate family are ideal since they contain standard glass forming oxides such as boron oxide and/or silicon oxide and a modifying oxide (lead oxide) which can be readily substituted by other metal oxides.

3. Taking the lead borosilicate glass as an example, the glass should contain some glass modifying ions which substitute for the lead in the nominal lead borosilicate glass composition. These ions should be chosen so as to have higher ionic field strengths than $Ba^{2+}$ to cause a reaction with the MLC dielectric body phases. Candidate ions and their ionic field strengths which fill this requirement are, among others $Ca^{2+}$ (2.04), $Mg^{2+}$ (4.59), $Zn^{2+}$ (3.65), $Sr^{2+}$ (1.59). These ions have ionic field strengths greater than $Pb^{2+}$ (1.39) and $Ba^{2+}$ (1.11) and therefore would tend to react with the barium titanate and the (barium, neodymium) titanate phase of the dielectric body and form new phases at the termination/body interface. The amount of high field strength ions in the glass should be at least 1% and preferably at least 10% by weight of the glass.

4. It is preferred that the bulk of the glass comprising the frit in the termination should be inert relative to the dielectric phases contained in the MLC body. The term "inert" refers to the frit having the property of having no extensive reaction with the phases in the dielectric to form new crystalline compounds at the interface between the termination and dielectric body. Glasses in the lead borosilicate system are ideal for this since the glass modifier, $Pb^{2+}$, has an ionic field strength of 1.39 which is almost equal to the ionic field strength of $Ba^{2+}$ of 1.11. The similarity of ionic field strengths of the two ions indicates that very little reaction between the lead borosilicate frit and the barium titanate dielectric should occur. In practice, this is what is observed when such frit compositions are used.

5. The ions which substitute for the $Pb^{2+}$ should be chosen such that when the termination is fired they form a titanate phase upon reaction with barium titanate and (barium, neodymium), titanate. Candidate ions are $Mg^{2+}$ (forms $MgTiO_3$), $Zn^{2+}$ (forms $Zn_2TiO_4$) and $Sr^{2+}$ (forms $SrTiO_3$), among others. Ions which satisfy all of the above criteria but form no titanate phases are not acceptable.

6. The ions which are substituted for the $Pb^{2+}$ in the lead borosilicate glass should be chosen so as to form phases at the dielectric/termination interface which have a different specific crystallographic unit cell volume per unit titanium atom than the barium titanate or (barium, neodymium) titanate phase which comprises the bulk of the MLC body. It is preferred that the difference between the crystallographic cell volumes be at least 10% and preferably at least 20%. Barium titanate ($BaTiO_3$) has a unit cell volume of 64.4 $A^3$, with one formula unit per unit cell, therefore 64.4 $A^3/Ti$. The best crystallographic description of the phase operative in (barium, neodymium) titanate dielectrics has a unit cell of 1043.7 $A^3$ with 18 Ti atoms per unit cell yielding 58.0 $A^3/Ti$. Specific examples of phases which will form due to reactions of the dielectric phases in the MLC body with ions present in the glass frit are $Zn_2TiO_4$ (75.7 $A^3/Ti$) when a lead borosilicate glass with partial or complete Zn substitution for the Pb is used, $CaTiO_3$ (55.9 $A^3/Ti$) when a lead borosilicate glass with partial or complete Ca substitution for the Pb is used, and $Mg_2TiO_4$ (75.2 $A^3/Ti$) when a lead borosilicate glass with partial or complete Mg substitution for the Pb is used, among others. The difference in the unit cells of the phase at the interface versus the bulk dielectric composition is a key to forming the internal stresses within the capacitor which helps alleviate the stresses due to soldering. A counter-example of a phase whose formation adds no stresses is $PbTiO_3$ which has a specific volume of 63.1 $A^3/Ti$, almost equal to that of $BaTiO_3$.

7. The amount of frit contained in the termination composition must be enough to form an adequate amount of reaction to cause the stresses which are desired. If too little frit is added, not enough of the phase at the reaction interface will form and the mechanism of this invention will be ineffective. Generally, the amount of frit will be 1-10% by weight of the paste and preferably 1-3%.

8. The frit must form a coherent or continuous gradation of crystallographic phases between the dielectric body and across the interfacial reaction zone to the termination. If too much frit is added, the extent of the reaction between the frit and the dielectric body will be so large that excessive stresses will build which may be relieved by the formation of a crack between the termination and the body. Such a crack will weaken the adhesion of the termination to the body and possibly also degrade electrical characteristics by allowing ingress of plating solution.

9. The frit must have a softening point which is high enough to avoid excessive bleedout of the frit to the surface of the fired termination. This softening point, measured using dilatometry, is approximately 400° C. or above. Avoidance of bleedout is necessary to avoid accumulation of the frit on the fired termination surface which renders the surface non-conductive and unplateable.

10. The frit must have a softening point which is low enough such that reaction of the frit with the dielectric to form the crystalline phases desired can occur. Too high a frit softening point will result in the frit having too high a viscosity at the termination firing temperature, and result in little reaction with the dielectric. The softening point suitable to have adequate reaction is preferably 600° C. or below. The softening point of the frit should not exceed about 700 C. lest the interface reactions become inadequate. Firing at 750 C. or higher is needed to obtain adequate sintering of the conductive phase.

EXAMPLES

Examples 1-7

Eight glass frits were prepared by mixing standard starting oxides, mixing and melting at 1400° C., then roller-quenched. The compositions of the frits are listed in Table 1. The glass softening points of the frits were measured using dilatometry. The frits were ground using ball milling to a surface area of approximately 2.8 to 3.6 $m^2/g$ using water milling with alumina media. The frits were dried at 120° C. overnight in air. Eight termination inks were prepared using these frits. The termination inks were of standard design, containing silver powders and an organic vehicle. The frit powders were added in a constant amount being 2.1% of the total termination ink composition. Typical silver content of the termination inks was 71.2 weight percent, determined using calcination of the ink at 750° C.

MLC parts were used to test the ability of the inks to effect thermal shock performance of the MLC parts. The parts were 1206 in design with a design capacitance of 0.1 uF and were X7R in temperature characteristic. Approximately 400 parts were dipped into each termination ink using a Palomar MLC termination application machine. Band widths, defined as the length of the end of the MLC part covered with termination ink were approximately 40 to 60 microns. The dipped parts were dried using a belt oven set to a maximum temperature of 160° C. The parts were then fired to densify the Ag powders and to react the termination frits with the dielectric using a belt furnace set with a 30 minute door-to-door profile with peak temperature of 810° C. The fired parts were then barrel plated using a standard nickel chloride/boric acid/nickel sulfate bath. Successful plating on all sets of parts was confirmed by observing that the unfired termination was dull in color whereas the plated termination was shiny. Successful plating was also confirmed by preparing cross-sections of the parts.

The plated parts were mounted on a standard FR-4 board using a heat curable epoxy to keep the parts in place. The boards were then soldered using wave soldering with no preheat, 260° C. 60/40 Pb/Sn solder, and a carrier belt speed of 10 feet/minute. The boards were cleaned and the exposed surfaces of the soldered MLC parts were examined using a microscope looking for surface cracks. Composition and performance data of Examples 1 through 7 are shown in Table 1.

TABLE 1

Compositions of Glass Frits in Examples 1–7

| Example | 1 | 2 | 3 | 4 | 5 | 6 | 7 |
|---|---|---|---|---|---|---|---|
| $B_2O_3$ (Mole %) | 4.2 | 23.9 | 4.2 | 4.2 | 4.2 | 4.2 | 4.2 |
| BaO | 0.0 | 1.1 | 0.0 | 0.0 | 0.0 | 0.0 | 0.0 |
| CaO | 0.0 | 3.1 | 0.0 | 7.1 | 0.0 | 10.7 | 0.0 |
| CdO | 1.8 | 0.0 | 1.8 | 0.0 | 0.0 | 0.0 | 0.0 |
| $K_2O$ | 0.0 | 1.5 | 0.0 | 0.0 | 0.0 | 0.0 | 0.0 |
| $Li_2O$ | 3.0 | 1.8 | 3.0 | 3.0 | 3.0 | 3.0 | 3.0 |
| MgO | 0.0 | 4.3 | 0.0 | 0.0 | 0.0 | 0.0 | 0.0 |
| $Na_2O$ | 5.1 | 1.3 | 5.1 | 5.1 | 5.1 | 5.1 | 5.1 |
| PbO | 21.0 | 0.0 | 21.0 | 21.4 | 21.4 | 17.8 | 17.8 |
| $SiO_2$ | 55.2 | 9.0 | 55.2 | 59.2 | 59.2 | 59.2 | 59.2 |
| $TiO_2$ | 6.6 | 0.0 | 6.6 | 0.0 | 0.0 | 0.0 | 0.0 |
| ZnO | 0.7 | 54.0 | 0.7 | 0.0 | 7.1 | 0.0 | 10.7 |
| $ZrO_2$ | 2.4 | 0.0 | 2.4 | 0.0 | 0.0 | 0.0 | 0.0 |
| Totals | 100.0 | 100.0 | 100.0 | 100.0 | 100.0 | 100.0 | 100.0 |
| Frit Type | 1 | 2 | 3 | 4 | 5 | 6 | 7 |
| Parts Soldered | 395 | 398 | 418 | 478 | 420 | 459 | 466 |
| Parts Cracked | 2 | 5 | 2 | 0 | 1 | 0 | 3 |
| Percent Parts Cracked | 0.51 | 1.26 | 0.48 | 0.00 | 0.24 | 0.00 | 0.64 |
| Frit Softening Point (°C.) | 512 | — | 512 | 492 | 452 | 501 | 451 |

Example 1 is a termination made using a standard lead borosilicate frit with low concentration of other ions. The frit, which has little interaction with the dielectric owing to its not containing significant quantities of ions with high ionic field strengths, shows a thermal shock cracking rate of 0.51%.

Example 2, a Zn-rich zinc borosilicate glass, shows a high incidence of thermal shock cracking due to a large extent of reaction with the dielectric. SEM, electron microprobe, and x-ray powder diffraction analyses showed a large interaction zone comprising $Zn_2Ti_4$ in composition. Note that this frit contained a high concentration of ZnO and that $Zn^{2+}$ has a high field strength relative to $Ba^{2+}$. The high concentration of ZnO caused too much interaction of the frit with the dielectric, producing excessive residual stresses with the accompanying deleterious effect on thermal shock cracking.

Example 3 is a repeat of Example 1 and shows similar thermal shock cracking rates.

Example 4 is a CdO-free version of the frit in Example 3 but with added CaO to promote the formation of $CaTiO_3$ at the termination/dielectric interface. SEM and microprobe analysis showed the interfacial reaction zone between the termination and MLC body to be primarily $CaTiO_3$ in composition. The addition of CaO yields zero thermal shock cracks. The formation of a $CaTiO_3$ interfacial layer at the termination/MLC body interface adds residual stresses to the MLC part which counteract the stresses imposed by wave soldering.

Similar addition ZnO to the frit of Example 3 (Example 5) showed the formation of $Zn_2TiO_4$ at the reaction interface and approximately half the incidence of thermal shock cracks of Example 3.

Higher levels of CaO in the frit (Example 6) shows no thermal shock cracks.

Example 7, the frit of Example 5 but with more added ZnO, shows more thermal shock cracks than the control lead borosilicate, indicating that this level of ZnO causes excessive stresses at the termination/MLC body interface rand adds to the stresses of wave soldering.

I claim:

1. A thick film conductor composition suitable for use in forming plateable base terminations for titanate-based MLCs consisting essentially of by weight basis solids finely divided particles of:

(a) 90–99% electrically conductive precious metal silver powder and (b) 10–1% metal oxide-based glass having a Dilatometer softening point of 400°–700° C. comprising 1–10% by weight, basis glass of at least one glass modifier(s) having an ionic field strength higher than the ionic field strength of a titanate cation which forms a titanate phase upon reaction with a multilayer capacitor titanate-based dielectric and the remainder of glass modifier(s) in the glass having an ionic field strength similar to the titanate cation, both (a) and (b) being dispersed in (c) an organic medium.

2. The composition of claim 1 in which the metal oxide-based glass is not ultrafast quenched.

3. The composition of claim 1 in which the titanate cation is Ba.

4. The composition of claim 1 which contains at least one glass modifier having an ionic field strength approximately equal to the ionic field strength of the titanate cation.

5. The composition of claim 4 in which the glass is a borosilicate or.

6. A multilayer capacitor comprising alternating layers of dielectric and conductive metal which has been terminated by (a) dipping the capacitor in a thick film paste of the composition of claim 1, and (b) firing the dipped capacitor at a temperature sufficient to effect volatilization of the organic medium and sintering of the conductive metal and metal oxide-based glass.

* * * * *